United States Patent
Hara

(10) Patent No.: US 7,920,288 B2
(45) Date of Patent: Apr. 5, 2011

(54) IMAGE FORMING APPARATUS, IMAGE FORMING METHOD AND PROGRAM

(75) Inventor: Katsuhiko Hara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1096 days.

(21) Appl. No.: 10/677,374

(22) Filed: Oct. 3, 2003

(65) Prior Publication Data

US 2004/0070790 A1  Apr. 15, 2004

(30) Foreign Application Priority Data

Oct. 4, 2002  (JP) ................................. 2002-292775

(51) Int. Cl.
*G06K 15/00* (2006.01)
*H04N 1/60* (2006.01)
*G06F 3/12* (2006.01)

(52) U.S. Cl. ...... 358/1.16; 358/1.14; 358/1.9; 358/3.23; 358/1.13

(58) Field of Classification Search .................. None
See application file for complete search history.

(56) References Cited

U.S. PATENT DOCUMENTS

| | | | | |
|---|---|---|---|---|
| 5,640,253 A * | 6/1997 | Uchida et al. | ............. | 358/501 |
| 5,729,735 A * | 3/1998 | Meyering | ............. | 1/1 |
| 5,835,098 A * | 11/1998 | Lipton | ............. | 345/589 |
| 5,878,198 A * | 3/1999 | Yuasa et al. | ............. | 358/1.18 |
| 5,881,209 A * | 3/1999 | Stokes | ............. | 358/1.9 |
| 6,111,654 A * | 8/2000 | Cartier et al. | ............. | 358/1.16 |
| 6,239,880 B1 * | 5/2001 | Barrett et al. | ............. | 358/1.16 |
| 6,266,152 B1 * | 7/2001 | Nakajima | ............. | 358/1.9 |
| 6,304,336 B1 * | 10/2001 | Sugaya | ............. | 358/1.16 |
| 6,430,311 B1 * | 8/2002 | Kumada | ............. | 382/162 |
| 6,493,101 B1 * | 12/2002 | Okazawa | ............. | 358/1.15 |
| 6,519,048 B1 * | 2/2003 | Tanaka | ............. | 358/1.13 |
| 6,606,163 B1 * | 8/2003 | Suzuki et al. | ............. | 358/1.15 |
| 6,621,589 B1 * | 9/2003 | Al-Kazily et al. | ............. | 358/1.15 |
| 6,636,903 B2 * | 10/2003 | Endoh et al. | ............. | 710/8 |
| 6,642,943 B1 * | 11/2003 | Machida | ............. | 715/763 |

(Continued)

FOREIGN PATENT DOCUMENTS

JP  08030408 A  *  2/1996

(Continued)

OTHER PUBLICATIONS

"What Is ColorWise 2.0?", Japanese Edition 2000 EFI-KK (Jun. 7, 2000) 12 pages.

(Continued)

*Primary Examiner* — Edward L Coles
*Assistant Examiner* — Hilina S Kassa
(74) *Attorney, Agent, or Firm* — Fitzpatrick, Cella, Harper & Scinto

(57) ABSTRACT

An object of the present invention is to obtain a desired output result when forming an image based on the resource data downloaded via a network by avoiding a situation that the downloaded resource data in incomplete state is employed for output. In order to accomplish the above object, the present invention provides an image forming method comprising a step (S901, S902) of holding the downloaded resource data, a step (S903 to S907) of determining whether or not the information necessary for forming the image is provided by analyzing the resource data, and a step (S908) of deleting the resource data held at the holding step, if as a result of the determination, it is determined that the information necessary for forming the image is not provided.

3 Claims, 16 Drawing Sheets

U.S. PATENT DOCUMENTS

| | | | |
|---|---|---|---|
| 6,693,718 B1 * | 2/2004 | Takaoka | 358/1.15 |
| 6,864,993 B1 * | 3/2005 | Roberts et al. | 358/1.9 |
| 6,865,354 B2 * | 3/2005 | Jackelen et al. | 399/81 |
| 6,947,174 B1 * | 9/2005 | Chen et al. | 358/1.9 |
| 7,068,380 B2 * | 6/2006 | Milton et al. | 358/1.13 |
| 7,095,529 B2 * | 8/2006 | Krueger et al. | 358/1.9 |
| 7,167,253 B2 * | 1/2007 | Endoh et al. | 358/1.14 |
| 7,180,630 B2 * | 2/2007 | Watanabe | 358/1.9 |
| 7,218,405 B1 * | 5/2007 | Aschenbrenner et al. | 358/1.15 |
| 7,298,526 B2 * | 11/2007 | Bailey | 358/1.9 |
| 7,301,672 B2 * | 11/2007 | Abe et al. | 358/1.9 |
| 7,511,843 B2 * | 3/2009 | Ikeno | 358/1.15 |
| 2001/0008002 A1 | 7/2001 | Hara | 710/240 |
| 2002/0030849 A1 * | 3/2002 | Takamiya | 358/1.15 |
| 2002/0057443 A1 * | 5/2002 | Watanabe | 358/1.9 |
| 2002/0186390 A1 * | 12/2002 | Hara | 358/1.9 |
| 2003/0184777 A1 * | 10/2003 | Ikeno | 358/1.9 |
| 2004/0073567 A1 * | 4/2004 | Pelon | 707/102 |
| 2004/0179237 A1 * | 9/2004 | Takenaka et al. | 358/2.1 |

FOREIGN PATENT DOCUMENTS

| | | | |
|---|---|---|---|
| JP | 10224643 A * | 8/1998 | |
| JP | 2000-163556 A | 6/2000 | |
| JP | 2002-57893 | 2/2002 | |
| JP | 2002-094823 A | 3/2002 | |

OTHER PUBLICATIONS

Japanese Office Action received May 9, 2008.

* cited by examiner

FIG. 12

| SET-UP ATTRIBUTES | SET OR NOT |
|---|---|
| PROFILE NAME | TRUE |
| PROFILE COPYRIGHT | FALSE |
| PROFILE MANUFACTURER | TRUE |
| PROFILE CREATION DATE AND TIME | TRUE |
| PROFILE USE PURPOSE | TRUE |
| PROFILE FORMAT VERSION | TRUE |
| PROFILE COLOR SPACE | TRUE |
| RESOURCE DEFAULT FLAG | TRUE |
| RESOURCE DEFAULT FLAG AT THE SHIPMENT FROM FACTORY | TRUE |

IMAGE FORMING APPARATUS, IMAGE FORMING METHOD AND PROGRAM

FIELD OF THE INVENTION

The present invention relates to an image forming technique for use in various printers such as a laser printer, a digital copying machine, and a facsimile apparatus, and more particularly to an image forming technique for using the resource data such as a profile, a look-up table, and dither that is downloaded from a host computer.

BACKGROUND OF THE INVENTION

In a typical color printer, the RGB color output is changeable according to the use purposes, such as the business graphics for which the conspicuous colors are suitable, the photographic images for which the smooth transition colors are suitable, and the absolute color metric.

To realize this feature, an application called ColorWise made by Electronics for Imaging, Inc., for example, supports an International Color Consortium (ICC) profile that is the standard in the color printing trade (refer to "ColorWise 2.0 White Paper Edition" made by Electronics for Imaging, Inc. in United States, Jun. 7, 2000). According to this application, the offset printing or simulation of data output from another copying machine is made by downloading an ICC profile into the printer. Also, the color output is enabled according to the color of a specific monitor or scanner.

Various resource data, such as the ICC profile, comprise device intrinsic information according to the purpose. That is, the resource data is composed of a resource object itself and the information indicating the characteristics of resource data. And at the time of downloading, it is required to download correctly the resource object itself into the printer and at the same time to convey the information indicating the characteristics of the resource data exhaustively and correctly.

However, in view of the use form of the resource data, it is a current situation that a resource data creator, a resource data downloading person and a resource data user are not necessarily coincident. Also, the applications are provided separately. Therefore, the information indicating the characteristics of the resource data may be incorrectly set in the printer, or the required resource object itself may not be always set, when the resource data is downloaded.

There was a problem that since the resource data downloaded into the printer in this state was incomplete as the resource data, no desired output result was obtained employing the resource data. Also, as described above, since the resource data creator, the resource data downloading person and the resource data user are not necessarily coincident, the reason why the desired output result is not obtained is often unknown. Therefore, there is a possibility that the incomplete resource data tries to be downloaded many times. In this case, there was a problem that the incomplete resource data remained in the printer to waste a storage area (e.g., a hard disk) of the printer.

SUMMARY OF THE INVENTION

This invention has been achieved in the light of the above-mentioned problems, and it is an object of the invention to obtain a desired output result by avoiding a situation that the downloaded resource data in incomplete state is employed for output when the resource data is downloaded into an image forming apparatus.

Also, it is another object of the invention to make effective use of a storage area of the device by preventing the downloaded resource data in incomplete state from wasting the storage area of the device.

In order to accomplish the above objects, according to this invention, there is provided an image forming method for forming an image based on the resource data downloaded via a network, comprising a step of holding the downloaded resource data, a step of determining whether or not the information necessary for forming the image is provided by analyzing the resource data, and a step of deleting the resource data held at the holding step, if as a result of the determination, it is determined that the information necessary for forming the image is not provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 12 is a table showing a list of attributes to be set as the resource data;

DETAILED DESCRIPTION OF THE PREFERRED EMBODIMENTS

First Embodiment

In the following headers 1 to 13, an image forming apparatus for implementing an image forming method according to one embodiment of the invention and the portions making up the image forming apparatus will be generally described, and in a paragraph of header 14, a process for downloading the resource data, which is a feature of the image forming method according to the embodiment of the invention, will be described.

1. Overall System Configuration

Figure 1:
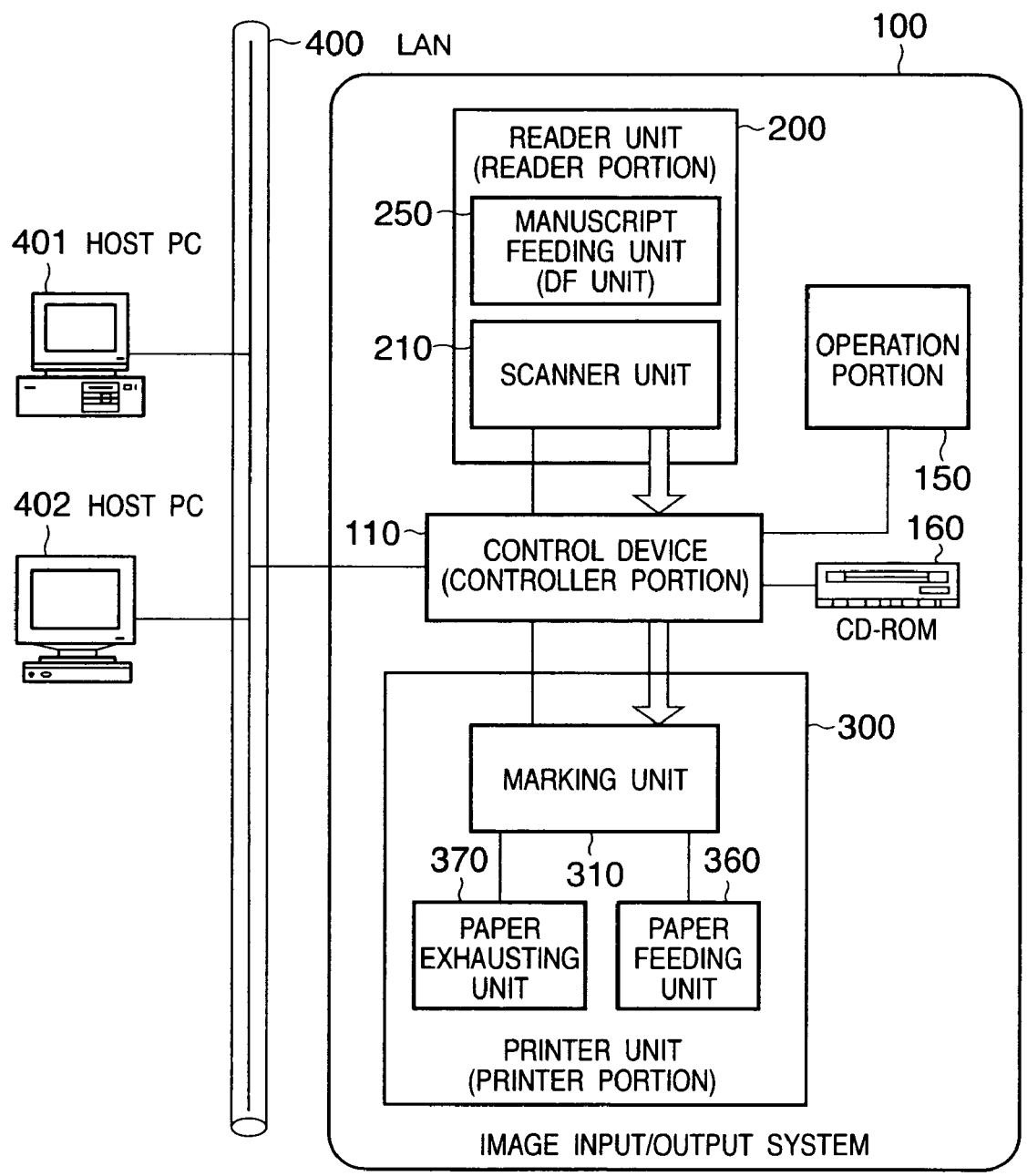
FIG. 1 is a block diagram showing the overall configuration of an image input/output system for implementing an image forming method according to one embodiment of the present invention.

Referring to FIG. 1, the overall configuration of an image input/output system that is an example of the image forming apparatus for implementing the image forming method according to the embodiment of the invention will be described.

A reader portion 200 optically reads a manuscript image and converts it into image data. The reader portion 200 comprises a scanner unit 210 having a function of reading the manuscript image and a manuscript feeding unit 250 having a function of conveying a manuscript sheet.

A printer portion 300 conveys a recording sheet, prints the image data as a visual image on the recording sheet, and exhausts it out of the printer. The printer portion 300 comprises a paper feeding unit 360 having plural kinds of recording sheet cassettes, a marking unit 310 having a function of transferring and fixing the image data to the recording sheet, and a paper exhausting unit 370 having a function of sorting, stapling and outputting the printed recording sheets.

A control device 110 is electrically connected to the reader portion 200 and the printer portion 300, and further connected via a LAN 400 to the host PCs 401 and 402.

The control device 110 controls the reader portion 200 to read the image data of a manuscript and controls the printer portion 300 to output the image data to the recording sheet to provide a copying function. Also, the control device 110 provides a scanner function of converting the image data read by the reader portion 200 into the code data that is then transmitted via the LAN 400 to the host PCs (401, 402), and a printer function of converting the code data received via the LAN 400 from the host PCs (401, 402) into the image data and outputting it to the printer portion 300.

An operation portion 150 is connected to the control device 110, and composed of a liquid crystal touch panel to provide a user I/F for operating the image input/output system 100.

Figure 2:
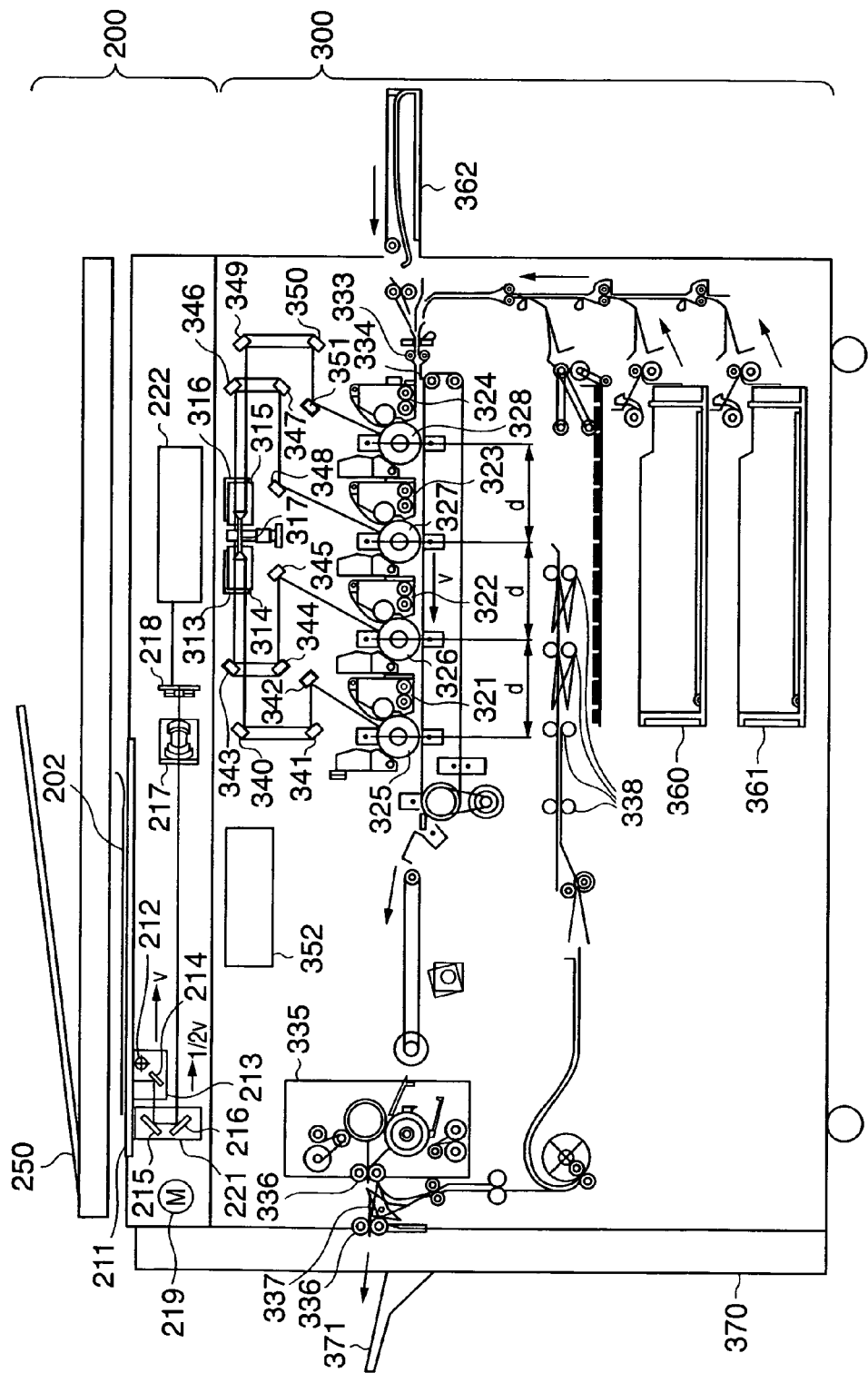
FIG. 2 is an appearance view of a reader portion and a printer portion in the image input/output system for implementing the image forming method according to one embodiment of the present invention.

FIG. 2 is a schematic view of the reader portion 200 and the printer portion 300. The manuscript feeding unit 250 of the reader portion 200 feeds the manuscript onto a platen glass 211, one by one in the order in which manuscripts appear, and after the end of reading the manuscript, exhausts the manuscript on the platen glass 211 out of the manuscript feeding unit 250. If the manuscript is conveyed onto the platen glass 211, a lamp 212 is lighted, and an optical unit 213 starts to move to expose and scan the manuscript. A reflected light from the manuscript at this time is led to a CCD image sensor (hereinafter referred to as a CCD) 218 by the mirrors 214, 215, 216 and a lens 217. In this way, the CCD 218 reads a scanned manuscript image.

222 is a reader image processing circuit portion for making a predetermined processing for the image data output from the CCD 218, and outputting the processed data via a scanner I/F 140 (hereinafter described) to the control device 110.

352 is a printer image processing circuit portion for outputting an image signal sent from the control device 110 via a printer I/F 145 (hereinafter described) to a laser driver 317.

The laser driver 317 in the printer portion 300 drives the laser emitting portions 313, 314, 315 and 316 to cause the laser emitting portions 313, 314, 315 and 316 to emit a laser beam according to the image data output from the printer image processing portion 352. This laser beam is radiated onto the photosensitive drums 325, 326, 327 and 328 by the mirrors 340 to 351 so that a latent image according to the laser beam is formed on the photosensitive drums 325, 326, 327 and 328. 321, 322, 323 and 324 are developing units for developing the latent image using the black (Bk), yellow (Y), cyan (C) and magenta (M) toners, in which the developed toner of each color is transferred onto the sheet and printed out in full color.

The sheet fed at a timing synchronous with the start of radiating the laser beam by any of the paper cassettes 360 and 361 and a manual insertion tray 362 is adsorbed through a resist roller 333 onto a transfer belt 334, and conveyed. And a developing agent deposited on the photosensitive drums 325, 326, 327 and 328 is transferred onto the recording sheet. The recording sheet with the developing agent thereon is conveyed to a fixing unit 335, so that the developing agent is fixed onto the recording sheet due to heat and pressure of the fixing unit 335. The recording sheet passed through the fixing unit 335 is exhausted by a sheet exhausting roller 336, and a sheet exhausting unit 370 bundles the exhausted recording sheets, assorts the recording sheets and staples the assorted recording sheets.

In the case where the perfect printing is set up, the recording sheet is conveyed up to the sheet exhausting roller 336, then reversed in the rotational direction of the sheet exhausting roller 336, and led to a sheet refeeding conveyance passage 338 by a flapper 337. The recording sheet led onto the sheet refeeding conveyance passage 338 is fed onto the transfer belt 334 at the above timing.

2. Reader Image Processing Portion

Figure 4:
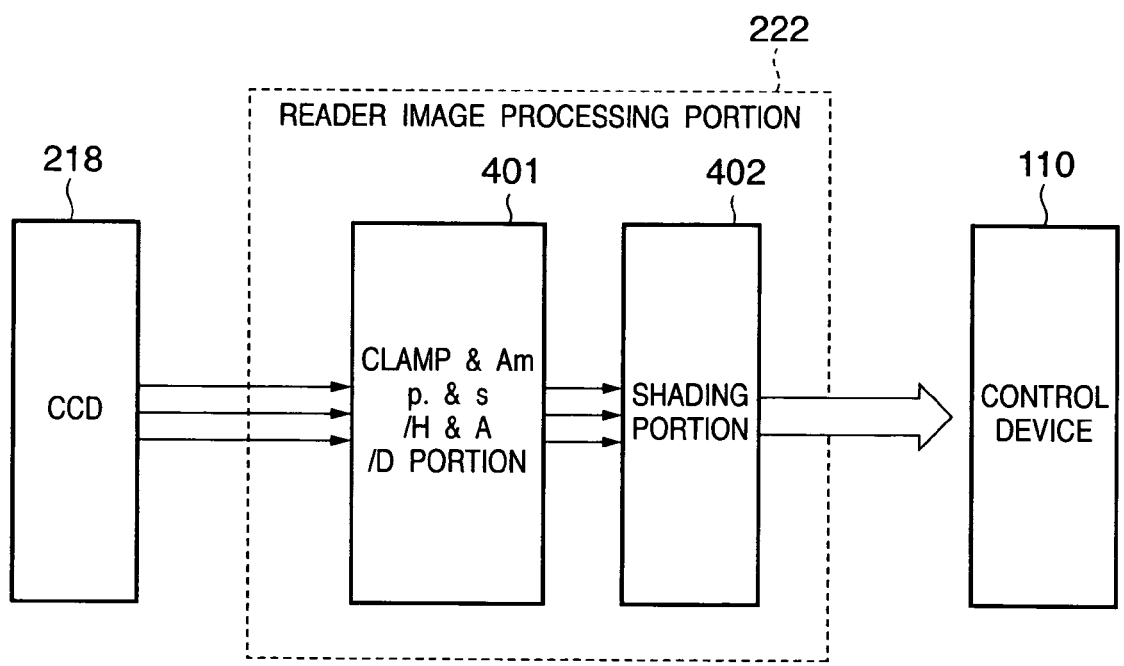
FIG. 4 is a block diagram of a reader image processing portion.

FIG. 4 is a block diagram showing the detailed configuration of the reader image processing portion 222.

In this reader image processing portion 222, the manuscript on the platen glass 211 is read by the CCD 218 and converted into an electrical signal (when the CCD 218 is a color sensor, the RGB color filter may lie inline on a one-line CCD in the order of RGB, the R filter, G filter and B filter may be arranged on a three-line CCD, or the filter may be on-chip or separated from the CCD). And the electrical signal (analog image signal) is input into the image processing portion 222, sampled and held (S/H) in a clamp & Amp. & S/H & A/D portion 401, a dark level of the analog image signal being clamped at a reference potential, amplified to a predetermined amount (the processing order is not necessarily the order of notation), A/D converted, and converted into a digital signal of RGB of 8 bits for each. And the RGB signal is subjected to the shading correction and black correction in a shading portion 402, and output to the control device 110.

3. Control Device

Figure 3:
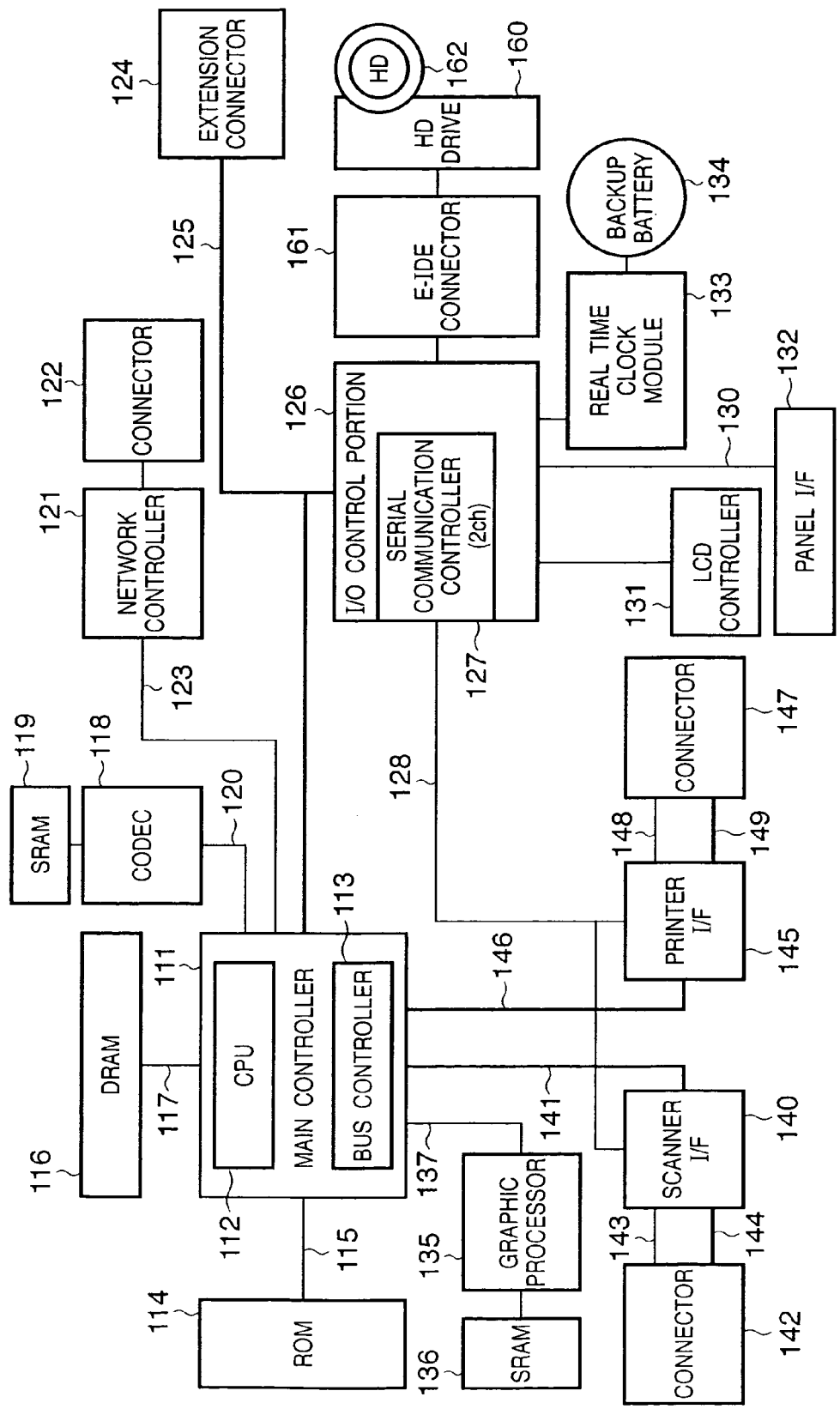
FIG. 3 is a block diagram of a control device for the image input/output system for implementing the image forming method according to one embodiment of the present invention.

Referring to a block diagram of FIG. 3, the functions of the control device 110 will be described below.

A main controller 111 mainly comprises a CPU 112, a bus controller 113, and various kinds of I/F controller circuits.

The CPU 112 and the bus controller 113 control the overall operation of the control device 110, in which the CPU 112 operates in accordance with a program read via a ROM I/F 115 from a ROM 114. Also, the operation of interpreting the PDL (page description language) code data received from the host computer and expanding it into raster image data is described in this program, and processed by software. The bus controller 113 controls the transfer of data input or output via each I/F, including regulating the bus contention and controlling the DMA transfer of data.

A DRAM 116 is connected via a DRAM I/F 117 to a main controller 111 and employed as a work area for the CPU 112 to operate and an area for accumulating the image data.

A Codec 118 compresses the raster image data accumulated in the DRAM 116 in a format of MH/MR/MMR/JBIG/JPEG, and conversely expands the code data compressed and accumulated to the raster image data. An SRAM 119 is employed as a general work area for the Codex 118. The Codec 118 is connected via an I/F 120 to the main controller 111, in which the transfer of data to or from the DRAM 116 is under the control of the bus controller 113 and made by the DMA.

A Graphic Processor 135 makes the image rotation, variable magnification, color space conversion, and binarization for the raster image data accumulated in the DRAM 116. An SRAM 136 is employed as a temporary work area of the Graphic Processor 135. The Graphic Processor 135 is connected via an I/F 137 to the main controller 111, in which the transfer of data to or from the DRAM 116 is under the control of the bus controller 113 and made by the DMA.

A Network Controller 121 is connected via an I/F 123 to the main controller 111, and via a connector 122 to an external network. The network is typically the Ethernet.

An extension connector 124 for connection of an extension board and an I/O controller 126 are connected to a general-purpose high speed bus 125. The general-purpose high speed bus may be typically a PCI bus.

The I/O controller 126 is equipped with a start-stop synchronization serial communication controller 127 for two channels serving to transmit and receive a control command to and from the respective CPUs of the reader portion 200 and the printer portion 300, and connected via an I/O bus 128 to the external I/F circuits 140 and 145.

A panel I/F 132 is connected to an LCD controller 131, and comprises an I/F for making the display on the liquid crystal screen in the operation portion 150 and a key input I/F 130 for inputting a hard key or a touch panel key.

The operation portion 150 comprises a liquid crystal display portion, a touch panel input unit bonded on the liquid crystal display portion and a plurality of hard keys. A signal input via the touch panel or hard key is passed via the panel I/F 132 to the CPU 112, so that the liquid crystal display portion displays the image data sent from the panel I/F 132. The liquid crystal display portion displays a function on the operation of this image forming apparatus or the image data.

A real time clock module 133 updates and saves the date and time managed within the apparatus, and is backed up by a backup battery 134.

An E-IDE connector 161 is employed for connection of an external storage device. In this embodiment, a hard disk drive 160 is connected via this E-IDE connector to store the image data in a hard disk 162 or read the image data from the hard disk 162.

The connectors 142 and 147 are connected to the reader portion 200 and the printer portion 300, respectively, and each comprises a start-stop synchronization serial I/F (143, 148) and a video I/F (144, 149).

A scanner I/F 140 is connected via a connector 142 to the reader portion 200, and via a scanner bus 141 to the main controller 111, and has a function of making a predetermined process for the image received from the reader portion 200 and a function of outputting a control signal generated based on a video control signal sent from the reader portion 200 to the scanner bus 141.

The data transfer from the scanner bus 141 to the DRAM 116 is controlled by the bus controller 113.

The printer I/F 145 is connected via a connector 147 to the printer portion 300, and via a printer bus 146 to the main controller 111, and has a function of making a predetermined process for the image data output from the main controller 111 and outputting the processed data to the printer portion 300 and a function of outputting a control signal generated based on a video control signal sent from the printer portion 300 to the printer bus 146.

The transfer of raster image data expanded on the DRAM 116 to the printer portion is under the control of the bus controller 113, and made by the DMA via the printer bus 146 and the video I/F 149 to the printer portion 300.

4. Scanner I/F Image Processing Portion

Figure 6:
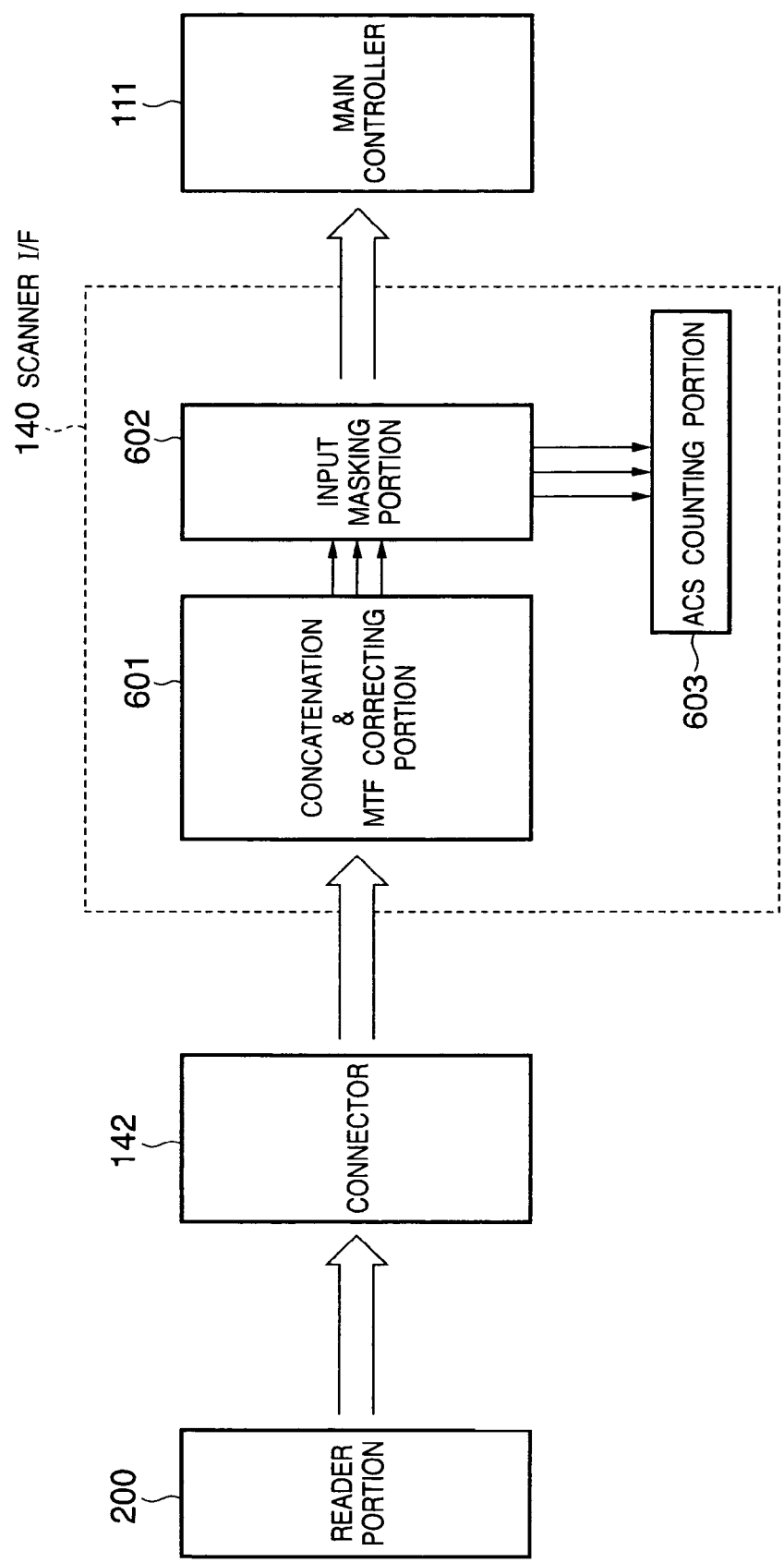
FIG. 6 is a block diagram of a scanner I/F image processing portion.

An image processing portion for the scanner I/F 140 will be described below in detail. FIG. 6 is a block diagram showing the detailed configuration of the image processing portion for the scanner I/F 140.

For an image signal sent via the connector 142 from the reader portion 200, when the CCD 218 is a three-line CCD, a concatenation & MTF correcting portion 601 makes a concatenation processing for adjusting a delay amount for each line according to a reading rate because the reading position between lines is different, and correcting a signal timing so that the reading positions of three lines are the same, and an MTF correction for correcting for a variation in the reading rate because a reading MTF is different with the reading rate. A digital signal having the corrected reading position timing is corrected for the spectral characteristics of the CCD 218, the lamp 212 and the mirrors 214, 215 and 216 by an input masking portion 602. An output of the input masking portion 602 is sent to an ACS counting portion 603 and the main controller 111.

5. ACS Counting Portion

Figure 5:
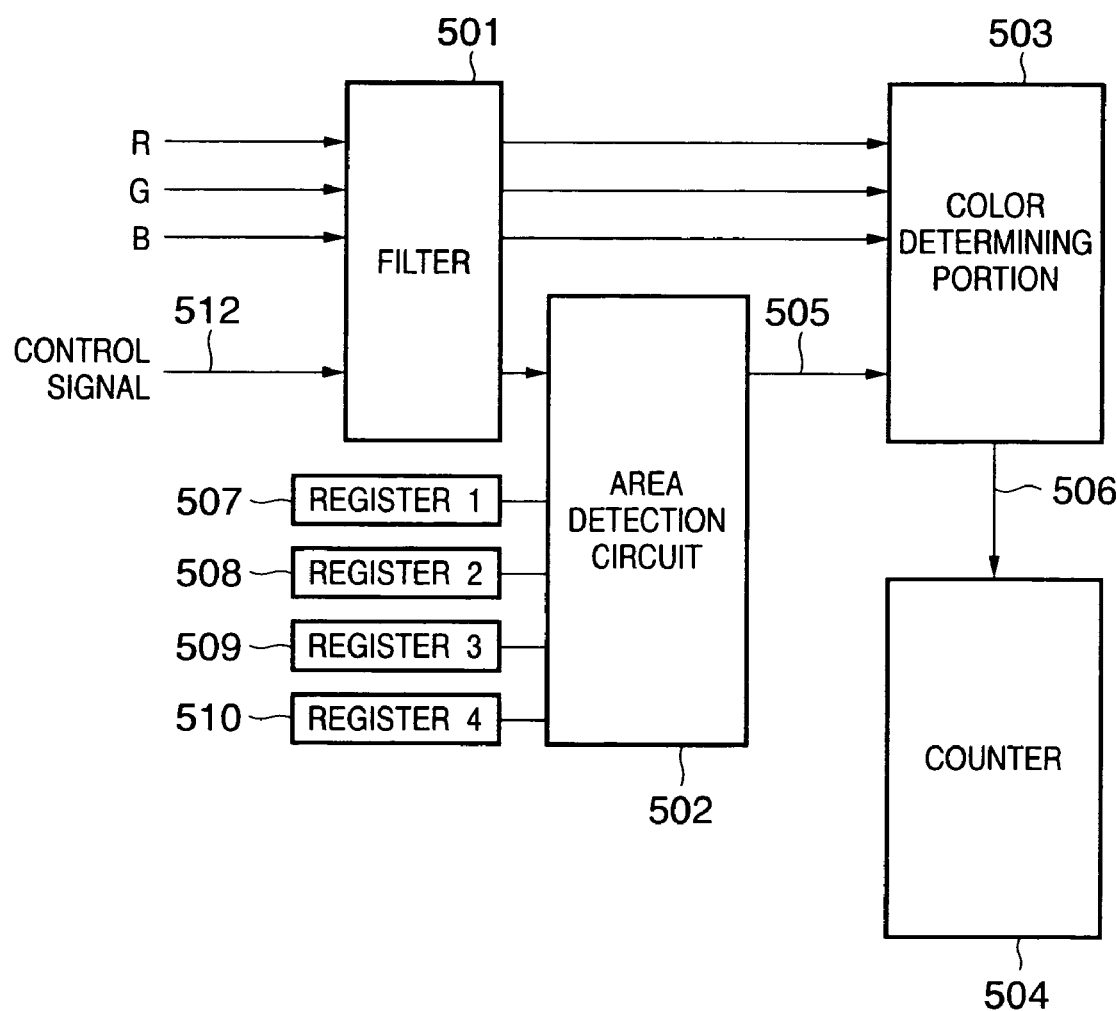
FIG. 5 is a block diagram of an ACS counting portion.

Referring to FIG. 5, the ACS (automatic color select) counting portion will be described below.

The automatic color select (ACS) determines whether the manuscript is color or black-and-white. That is, the color determination is made by acquiring the saturation for each pixel and based on the number of pixels at or above a threshold value. However, in even the black-and-white manuscript, there are many color pixels microscopically on the periphery of the edge under the influence of MTF, whereby it is difficult to simply determine the ACS in a unit of pixel. Various ACS methods are provided, but the ACS method does not matter in this embodiment, whereby the typical ACS method is employed to give explanation.

As described above, since the black-and-white image contains many color pixels as seen microscopically, it is required to determine whether or not the pixel is really chromatic, based on the information of color pixels around the pixel of interest. 501 is a filter having an FIFO structure to refer to the peripheral pixels for the pixel of interest. 502 is a circuit for generating an area signal 505 subjected to the ACS, based on the values set up in the registers 507 to 510 from the main controller 111 and a video control signal 512 sent from the reader portion 200. 503 is a color determination portion for determining whether the pixel of interest is the color pixel or the black-and-white pixel by referring to the peripheral pixels within a memory in the filter 501 for the pixel of interest, based on the area signal 505 subjected to the ACS. 504 is a counter for counting the number of color determination signals output from the color determination portion 503.

The main controller 111 decides an area subjected to the ACS in a reading range and sets it in the registers 507 to 510 (an independent range is decided for the manuscript in this embodiment). Also, the main controller 111 compares the value of the counter for counting the number of color determination signals within the area subjected to the ACS with a predetermined threshold value and determines whether the manuscript is color or black-and-white.

The registers 507 to 510 set up a start position for starting the determination of the color determination portion 503 in a main scan direction and a sub scan direction, and an end position for ending the determination, based on the video control signal 512 sent from the reader portion 200. In this embodiment, they are set about 10 mm smaller than the actual size of the manuscript.

6. Printer I/F Image Processing Portion

Figure 7:
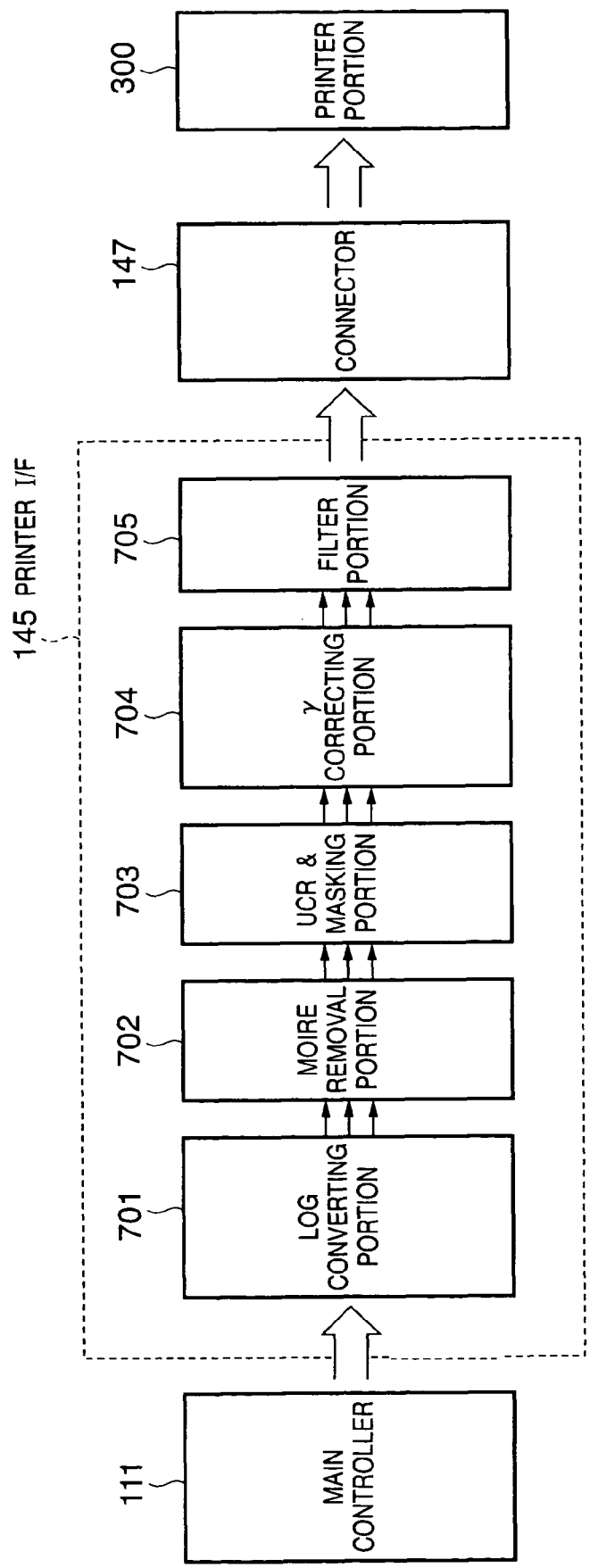
FIG. 7 is a block diagram of a printer I/F image processing portion.

A printer I/F 145 image processing portion will be described in detail. FIG. 7 is a block diagram showing the detailed configuration of the printer I/F 145 image processing portion.

An image signal sent via the printer bus 146 from the main controller 111 is firstly input into an LOG converting portion 701. The LOG converting portion 701 makes the LOG conversion from an RGB signal to a CMY signal. Then, a moire removal portion 702 removes the moire. 703 is a UCR & masking portion for generating a CMYK signal from the CMY signal processed for moire removal through a UCR processing and correcting it according to the output of the printer in a masking processing portion. The signal processed in the UCR & masking portion 703 is adjusted for the density in a gamma (γ) correcting portion 704, and then subjected to a smoothing or edge processing in a filter portion 705. Through these processings, the image is sent via the connector 147 to the printer portion 300.

7. Graphic Processor

Figure 8:
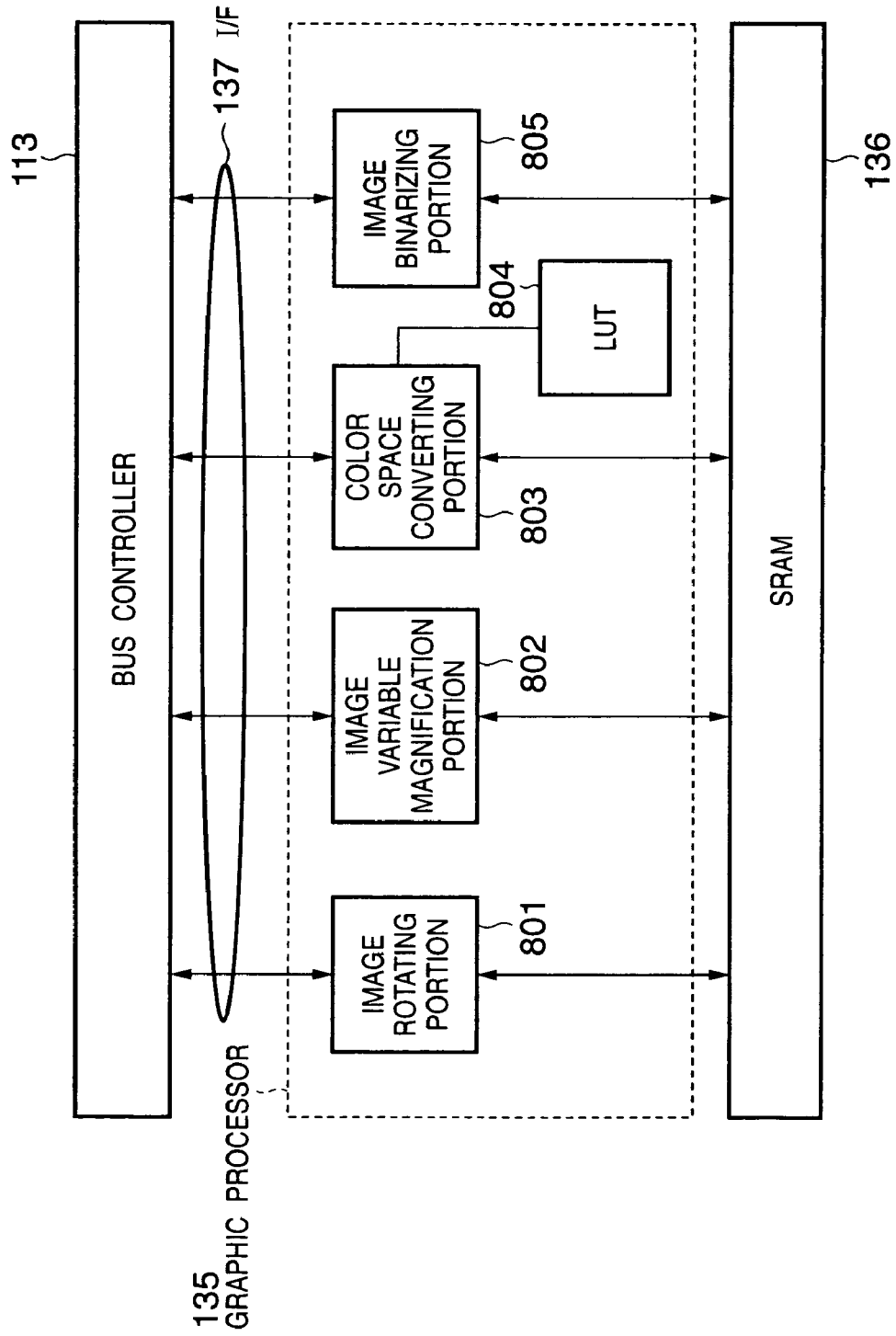
FIG. 8 is a block diagram of a Graphic Processor.

A Graphic Processor 135 will be described in detail. FIG. 8 is a block diagram showing the detailed configuration of the Graphic Processor 135.

The Graphic Processor 135 has a module for making each of the image rotation, variable magnification, color space conversion, and binarization. The SRAM 136 is employed as a temporary work area of each module of the Graphic Processor 135. It is supposed that the work area of the SRAM 136 for each module is preassigned statistically not to cause a competition between the modules. The Graphic Processor 135 is connected via the I/F 137 to the main controller 111, in which the transfer of data to or from the DRAM 116 is under the control of the bus controller 113 and made by the DMA.

The bus controller 113 controls the setting of a mode in each module of the Graphic Processor 135 and the timing for transferring the image data to each module.

8. Image Rotating Portion

A processing procedure of an image rotating portion 801 is shown below.

The image rotation control is set up via the I/F 137 from the CPU 112 to the bus controller 113. This allows the bus controller 113 to make the settings (e.g., image size, and rotational direction and angle) required for image rotation to the image rotating portion 801. After the required settings are made, the CPU 112 makes a permission for transferring the image data to the bus controller 113 again. In accordance with this permission, the bus controller 113 starts to transfer the image data from the DRAM 116 or the device connected via each I/F. It is supposed here that the image size of rotation is 32 pixels×32 lines, and the image transfer occurs in a unit of 24 bytes (one pixel of 8 bits for each of RGB) on the image bus.

Figure 13:
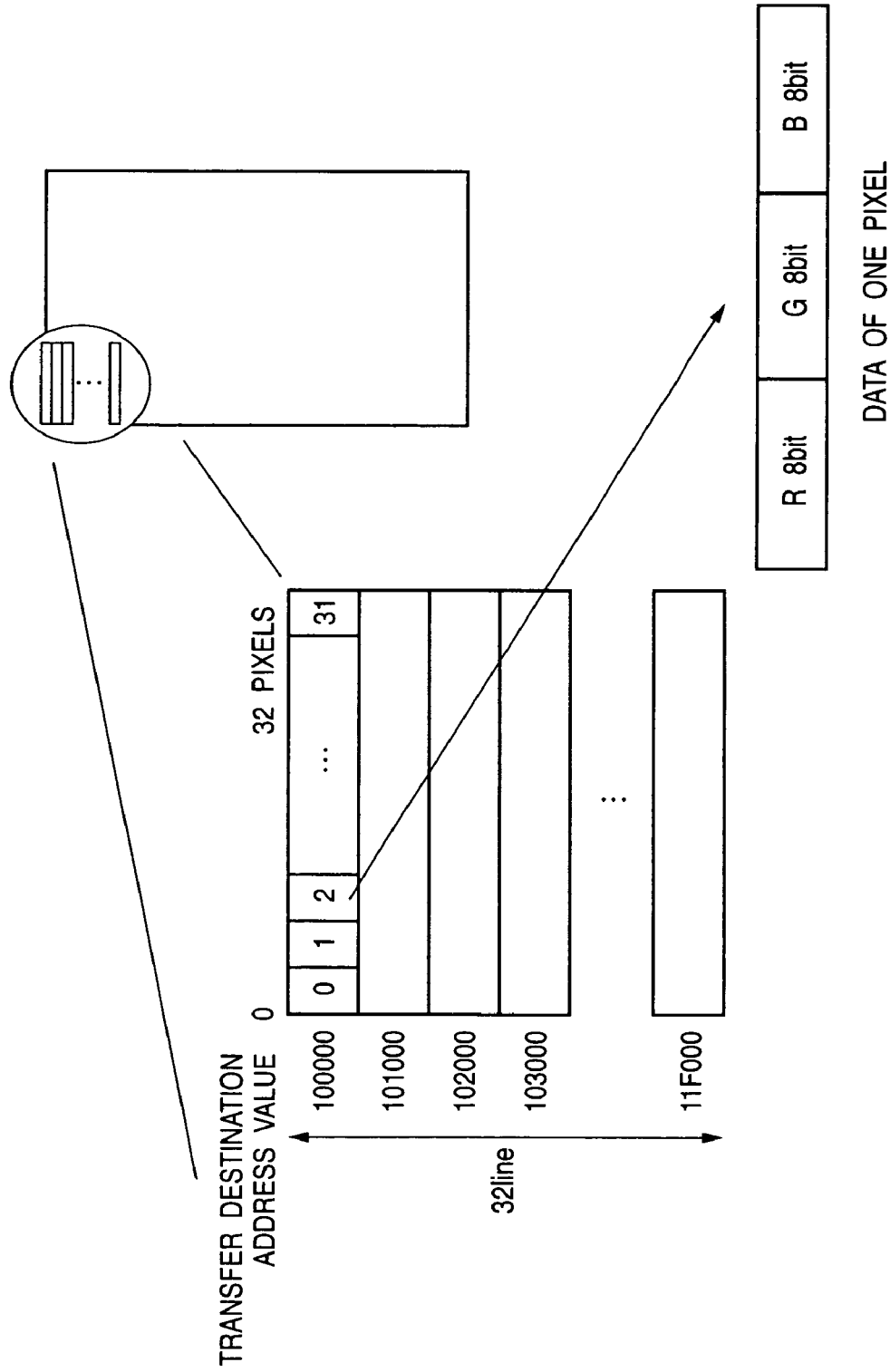
FIG. 13 is a view for explaining the operation of an image rotating portion.

To obtain the image of 32 pixels×32 lines, it is required to repeat the unit data transfer by 32×32 times in the above manner, and to transfer the image data from discontinuous addresses (see FIG. 13).

Figure 14:
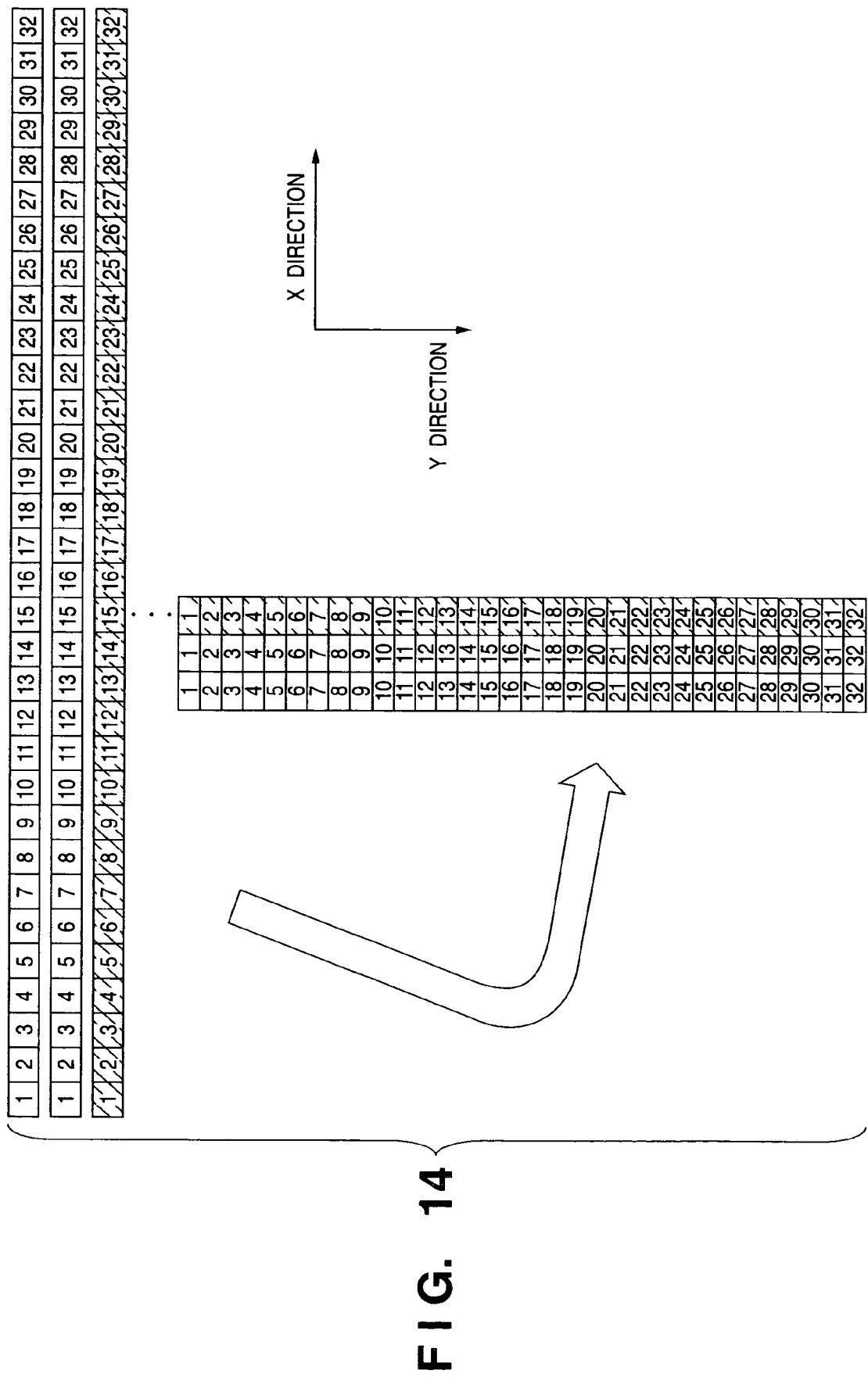
FIG. 14 is a view for explaining the operation of the image rotating portion.

The image data transferred by discontinuous addressing is written into the SRAM 136 so that it may have a desired angle of rotation at the time of reading. For example, when rotated counterclockwise by 90 degrees, the image data to be transferred is written in the Y direction as shown in FIG. 14. At the reading time, the image data is read in the X direction and thus rotated.

After the image of 32 pixels×32 lines has been rotated (written into the SRAM 136), the image rotating portion 801 reads the image data from the SRAM 136 by the above reading method, and transfers the image to the bus controller 113.

The bus controller 113 having received the rotated image data transfers the data to the DRAM 116 or each device on the I/F by continuous addressing.

Such a series of processings is repeated until there is no processing request from the CPU 112 (processing for a required number of pages is ended).

9. Image Variable Magnification Portion

A processing procedure of an image variable magnification portion 802 is shown below.

The image variable magnification control is set up via the I/F 137 from the CPU 112 to the bus controller 113. This allows the bus controller 113 to make the settings (e.g., variable magnification factor in the main scan direction, variable magnification factor in the sub scan direction, and image size after variable magnification) required for image variable magnification to the image variable magnification portion 802. After the required settings are made, the CPU 112 makes a permission for transferring the image data to the bus controller 113 again. In accordance with this permission, the bus controller 113 starts to transfer the image data from the DRAM 116 or the device connected via each I/F.

The image variable magnification portion 802 temporarily stores the received image data in the SRAM 136, and performs a variable magnification process for expanding or contracting the image by making an interpolation process for the stored image data by a required number of pixels and a required number of lines in accordance with the variable magnification factors in the main and sub scan directions, employing the SRAM 136 as an input buffer. The variably magnified data is rewritten into the SRAM 136 again, whereby the image variable magnification portion 802 reads the image data from the SRAM 136, employing the SRAM 136 as an output buffer, and transfers it to the bus controller 113.

The bus controller 113 having received the variably magnified image data transfers the data to the DRAM 116 or each device on the I/F.

10. Color Space Converting Portion

A processing procedure of a color space converting portion 803 is shown below.

The color space conversion control is set up via the I/F 137 from the CPU 112 to the bus controller 113. This allows the bus controller 113 to make the settings (e.g., matrix coefficients for the matrix operation as hereinafter described, table values of an LUT 804) required for color space conversion to the color space converting portion 803 and the LUT (lookup table) 804. After the required settings are made, the CPU 112 makes a permission for transferring the image data to the bus controller 113 again. In accordance with this permission, the bus controller 113 starts to transfer the image data from the DRAM 116 or the device connected via each I/F.

First of all, the color space converting portion 803 makes a 3×3 matrix operation represented by the following expression on each pixel of the received image data.

$$\begin{pmatrix} X \\ Y \\ Z \end{pmatrix} = \begin{pmatrix} a11 & a12 & a13 \\ a21 & a22 & a23 \\ a31 & a32 & a33 \end{pmatrix} \begin{pmatrix} R+b1 \\ G+b2 \\ B+b3 \end{pmatrix} + \begin{pmatrix} c1 \\ c2 \\ c3 \end{pmatrix}$$ [Equation 1]

In the above expression, R, G and B are input, X, Y and Z are output, and a11, a12, a13, a21, a22, a23, a31, a32, a33, b1, b2, b3, C1, C2 and c3 are coefficients.

In the operation of the above expression, various color space conversions including from RGB color space to Yuv color space are performed.

Then, the data after the matrix operation is converted by the LUT 804. Thereby, the non-linear conversion may be performed. As a matter of course, the LUT conversion may not be materially performed by setting the table through.

Thereafter, the color space converting portion 803 transfers the image data subjected to the color space conversion process to the bus controller 113.

The bus controller 113 receiving the image data subjected to the color space conversion process transfers the data to the DRAM 116 or each device on the I/F.

11. Image Binarizing Portion

A processing procedure of an image binarizing portion 805 is shown below.

The binarization control is set up via the I/F 137 from the CPU 112 to the bus controller 113. This allows the bus controller 113 to make the settings (e.g., various parameters according to the conversion method) required for binarization process to the image binarizing portion 805. After the required settings are made, the CPU 112 makes a permission for transferring the image data to the bus controller 113 again. In accordance with this permission, the bus controller 113 starts to transfer the image data from the DRAM 116 or the device connected via each I/F.

The image binarizing portion 805 makes a binarization process for the received image data. In this embodiment, the binarization method involves comparing the image data with a predetermined threshold value and binarizing the image data. Of course, a dither method, an error diffusion method and an improved error diffusion method may be employed.

Thereafter, the image binarizing portion 805 transfers the binarized image data to the bus controller 113.

The bus controller 113 receiving the binarized image data transfers the data to the DRAM 116 or each device on the I/F.

12. PDL Image Output Sequence

Figure 15:
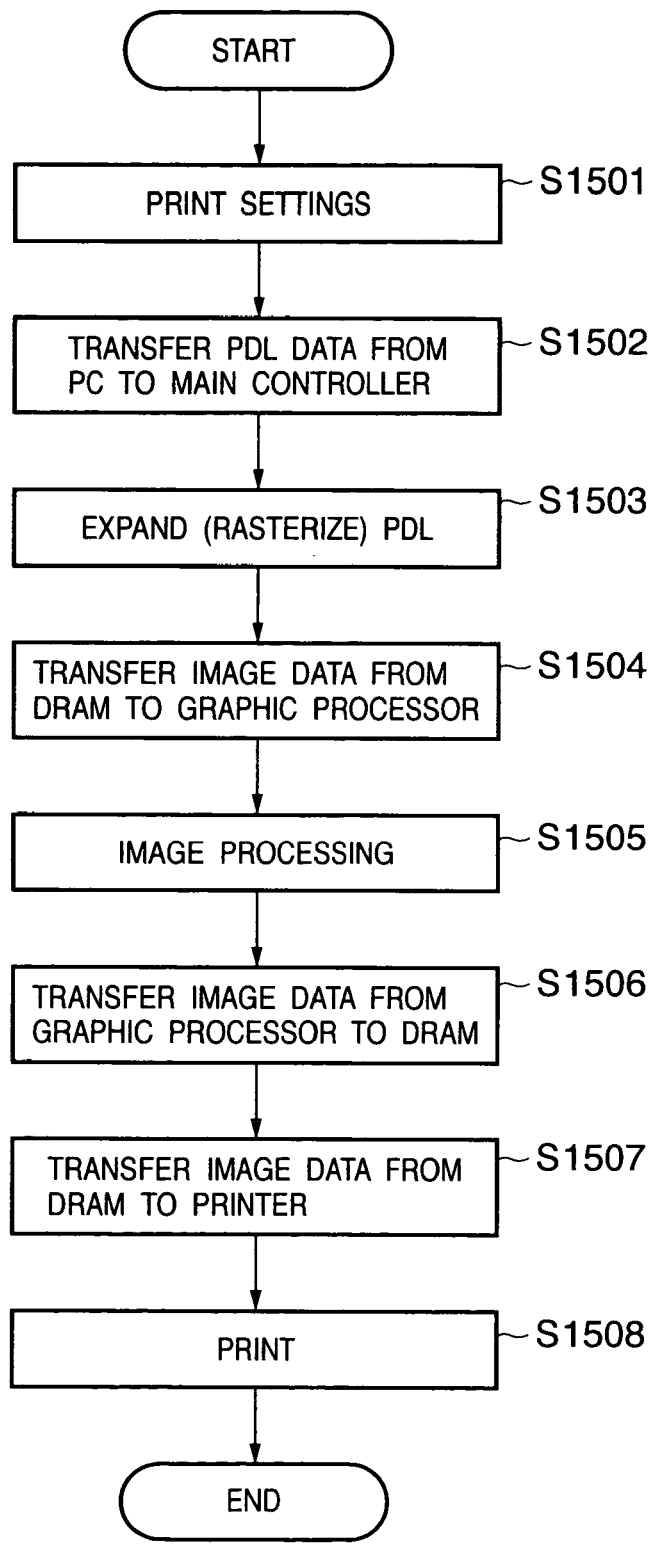
FIG. 15 is a flowchart showing a sequence of outputting a PDL image.

FIG. 15 is a flowchart showing a PDL image output procedure in this embodiment. In FIG. 15, S1501 to S1508 denote the steps.

When a PDL image is output, the user makes the print settings for an output job of the PDL image on the PC 401 at step S1501. The contents of the print settings include the number of copies, paper size, one side/both sides, page output order, sort output and stapling.

At step S1502, a print instruction is issued on the PC 401, and a driver software installed on the PC 401 converts the code data to be printed on the PC 401 into the so-called PDL data, and transfers the PDL data together with the print setting parameters set at step S1501 to the control device 110 of the image input/output device via a network 400.

At step S1503, the CPU 112 of the main controller 111 for the control device 110 expands (rasterizes) the PDL data transferred via the connector 122 and the Network Controller 121 into the image data, based on the print setting parameters. Expansion of the image data is made on the DRAM 116. If the expansion of the image data is completed, the procedure proceeds to step S1504.

At step S1504, the main controller 111 transfers the image data expanded on the DRAM 116 to the Graphic Processor 135.

At step S1505, the Graphic Processor 135 makes the image processing, independently of the print setting parameters. For example, in a case where there are A4R sheets alone in the paper feeding unit 360 of the printer portion 300 though the paper size of A4 is designated by the print setting parameter, the Graphic Processor 135 rotates the image by 90 degrees to output the image according to the output sheet. If the image processing for the image data is completed, the procedure proceeds to step S1506.

At step S1506, the Graphic Processor 135 transfers the image data after the image processing to the main controller 111. The main controller 111 stores the transferred image data in the DRAM 116.

At step S1507, the main controller 111 controls the printer portion 300 via the printer I/F 145 and the connector 147 and transfers the image data on the DRAM 116 to the printer portion 300 at an appropriate timing.

At step S1508, the control device 110 controls the printer portion 300 to print the image data. If the transfer of image data is completed, that is, the PDL job is ended, the printing is ended.

13. Copy Image Output Sequence

Figure 16:
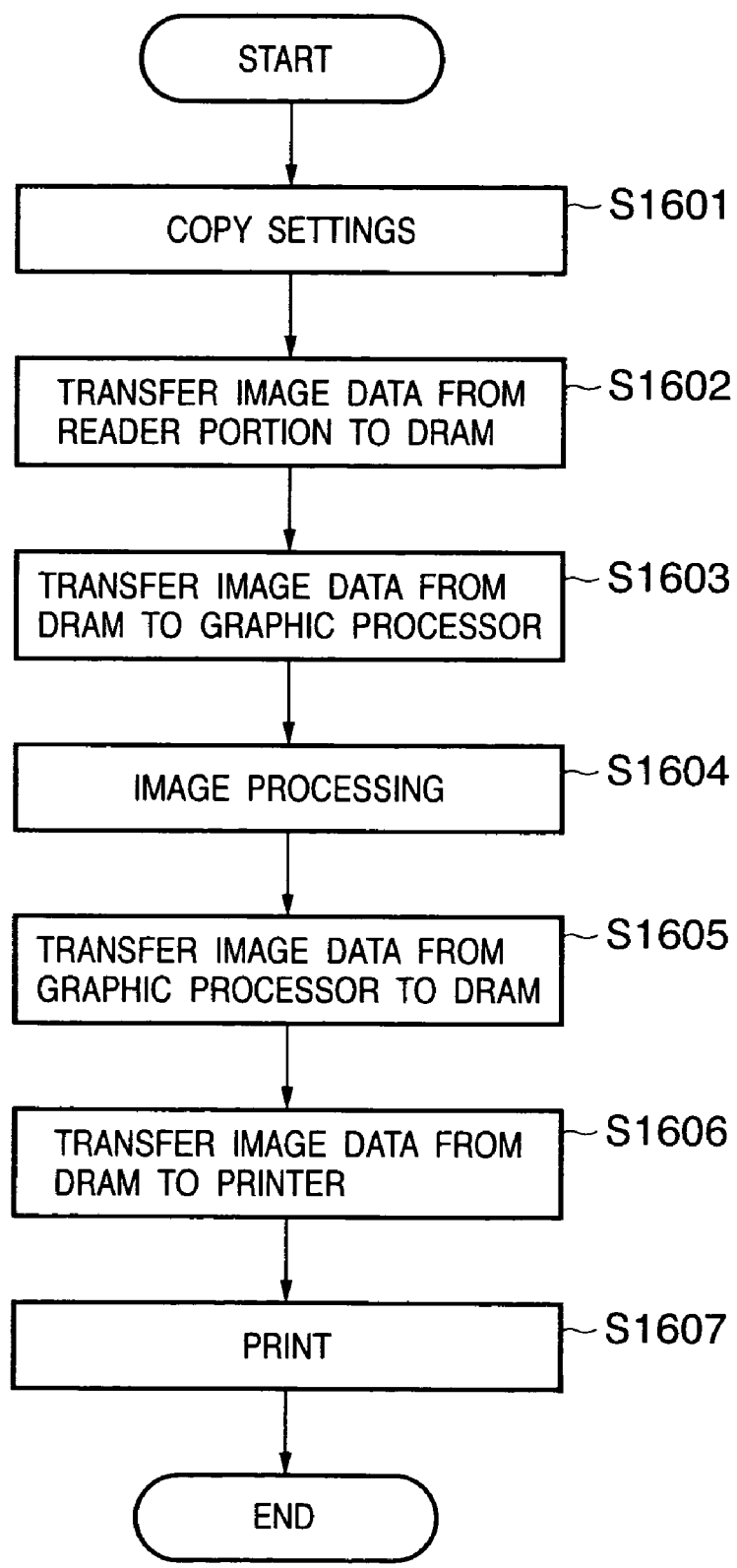
FIG. 16 is a flowchart showing a sequence of outputting a copy image.

FIG. 16 is a flowchart showing a copy image output procedure in this embodiment. In FIG. 16, S1601 to S1607 denote the steps.

When a copy image is output, the user makes the copy settings for an output job of the copy image on the operation portion 150 at step S1601. The contents of the copy settings include the number of copies, paper size, one side/both sides, enlargement/reduction ratio, sort output and stapling.

At step S1602, if a copy start instruction is issued on the operation portion 150, the main controller 111 of the control device 110 controls the reader portion 200 via the scanner I/F 140 and the connector 142 to read the image data of manuscript.

First of all, the manuscript feeding unit 250 feeds the manuscript laid thereon one by one onto the platen glass 211, and detects the size of manuscript at the same time. The manuscript is exposed and scanned based on the detected size of manuscript to read the image data. The read image data is stored in the DRAM 116.

In the conventional copying machine, a variable magnification process in the sub scan direction was implemented by changing the moving speed of the optical unit 213 according to the enlargement/reduction ratio of the copy settings, namely, the variable magnification factor in the sub scan direction. However, in this embodiment, the image data is always read at equal magnification (100%), irrespective of the enlargement/reduction ratio of the copy settings, and the variable magnification process in both the main scan direction and the sub scan direction is performed by the Graphic Processor 135.

At step S1603, the main controller 111 transfers the image data on the DRAM 116 to the Graphic Processor 135.

At step S1604, the Graphic Processor 135 performs the image processing, based on the copy setting parameters. For example, when an enlargement ratio of 400% is set, the variable magnification process in both the main scan direction and the sub scan direction is performed by the image variable magnification portion 802 that is a module in the Graphic Processor 135. If the image processing for the image data is completed, the procedure proceeds to step S1605.

At step S1605, the Graphic Processor 135 transfers the image data after the image processing to the main controller 111. The main controller 111 stores the transferred image data in the DRAM 116.

At step S1606, the main controller 111 controls the printer portion 300 via the printer I/F 145 and the connector 147 and transfers the image data on the DRAM 116 to the printer portion 300 at an appropriate timing.

At step S1607, the control device 110 controls the printer portion 300 to print the image data. If the transfer of image data is completed, that is, the copy job is ended, the printing is ended.

14. Resource Data Downloading Process

Figure 9:
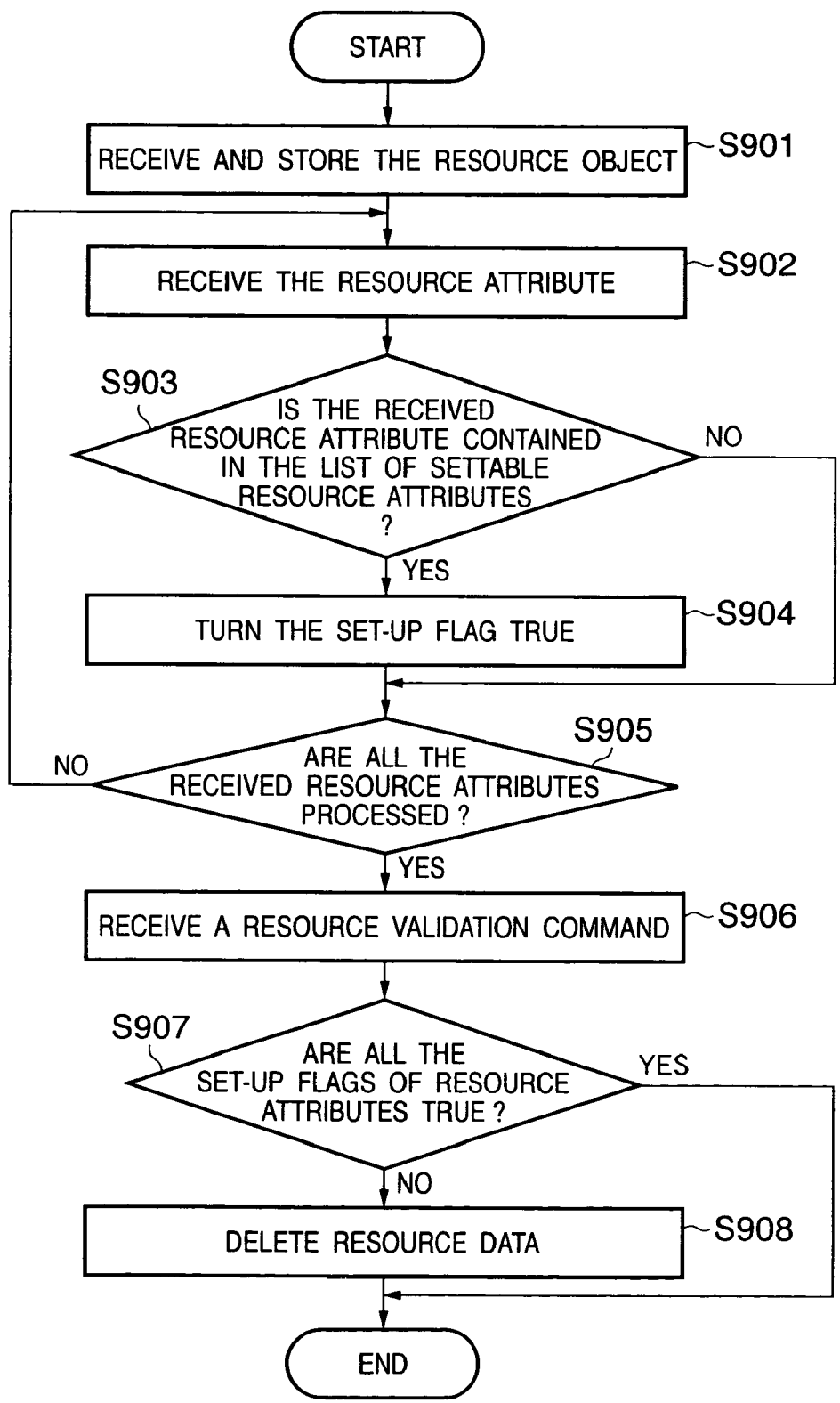
FIG. 9 is a flowchart showing a process for deleting the improper resource data when downloaded, the process being performed in an image forming device for implementing the image forming method according to a first embodiment of the present invention.

Referring to FIG. 9, a resource data downloading process will be described below with an instance where the downloaded resource data is deleted, if it is incorrect.

At step S901, the resource data is received and stored. The resource data is composed of a resource object itself and the information indicating the characteristics of the resource data (referred to as a resource attribute). The resource attributes include the information managed by the profile creator and the created application, such as "profile name", "profile copyright" and "profile creation date and time" in the case of an ICC profile resource.

The resource object is downloaded from a download application of the resource data residing in the host PC 401 via the LAN 400 to the image input/output system 100, as shown in FIG. 1. The resource object may be stored in a secondary storage device such as a hard disk.

At step S902, the resource attributes are likewise set up from the download application of the resource data residing in the host PC 401 via the LAN 400 into the image input/output system 100, as shown in FIG. 1.

At step S903, a determination is made whether or not the received resource attribute is to be set up. The resource attributes to be necessarily set up (i.e., required for the image forming process) are decided in advance based on the characteristics of the device by the resource data creator (a list of set attributes created by the resource data creator is stored at a predetermined location). FIG. 12 shows an example of the list of set attributes. It is checked whether or not any resource attribute set at step S902 exists in the list of attributes as shown in FIG. 12. If it exists, the procedure proceeds to step S904. If not, the procedure goes to step S905.

At step S904, a flag indicating the set-up of resource attribute is made true in the table for the list of resource attributes as shown in FIG. 12, and the procedure proceeds to step S905.

At step S905, a confirmation is made whether or not the flag indicating that all the resource attributes downloaded are set in the list of resource attributes is made true. After the processing for all the resource attributes downloaded is ended, the procedure proceeds to step S906.

At step S906, an instruction for validating the resource data that is downloaded from the download application of the resource data residing in the host PC 401 via the LAN 400 into the image input/output system 100 is received, as shown in FIG. 1. The image input/output system 100 can recognize the downloaded resource data owing to this validation.

At step S907, a determination is made whether or not the downloaded resource data is incorrect. This determination is made by checking whether or not there is any attribute having the flag of false in the list of resource attributes to be set as shown in FIG. 12. If any one of the attributes is not set (i.e., any one of the information required for the image forming process is not provided), it is judged that the resource data is incorrect or incomplete, and the procedure proceeds to step S908. If all the attributes are set, it is judged that the resource data is correct, whereby the resource data is usable from the following job.

Step S908 takes place when it is judged that the downloaded resource data is incorrect. In this case, since there is a high possibility that the desired output result is not obtained employing the resource data, the resource data is deleted by the image input/output system 100 (thereby avoiding a situation that the downloaded resource data in incomplete state is employed for output).

As will be apparent from the above explanation, according to this embodiment, it is judged whether or not the downloaded resource data is correct by control device 110, using the resource attributes. Only if it is judged that the resource data is correct, the resource data is made usable, so that the desired output result is obtained by avoiding a situation that the downloaded resource data in incomplete state is employed for output.

Also, if it is judged that the resource data is incorrect, the resource data is deleted to prevent the storage area of the device from being wasted by the downloaded resource data in the incomplete state, making it possible to effectively use the storage area of the device.

Second Embodiment

In the first embodiment, the resource data downloading process involves outputting the correct resource data only, but not outputting the incorrect resource data. However, another method may be available.

Figure 10:
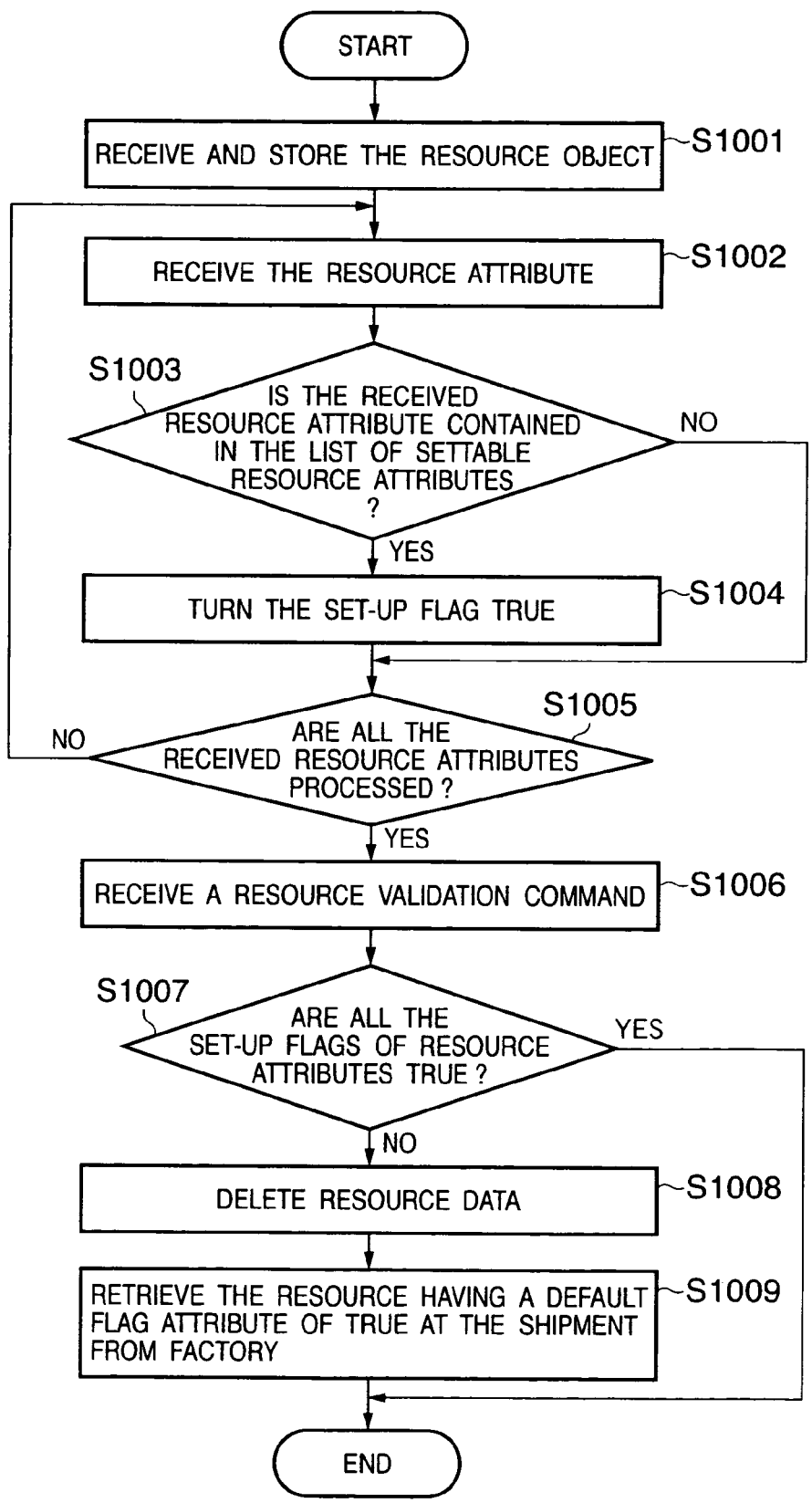
FIG. 10 is a flowchart showing a process for deleting the improper resource data when downloaded, and setting default resource data in shipping the device from the factory, the process being performed in an image forming device for implementing the image forming method according to a second embodiment of the present invention.

In this second embodiment, when the downloaded resource data is incorrect, the resource data is deleted, and the resource data at the time of shipment from the factory is employed for the print job. Thereby, even though the downloaded resource data is incorrect, the resource data is output without employing the incorrect resource data. Referring to FIG. 10, the second embodiment will be described below.

At step S1001, the resource data is received and stored. As described above, the resource data is composed of a resource object itself and the information indicating the characteristics of the resource data (referred to as a resource attribute). The resource attributes include the information managed by the profile creator and the created application, such as "profile name", "profile copyright" and "profile creation date and time" in the case of an ICC profile resource.

The resource object is downloaded the download application from the resource data residing in the host PC 401 via the LAN 400 to the image input/output system 100, as shown in FIG. 1. The resource object is stored in a secondary storage device such as a hard disk.

At step S1002, the resource attributes are likewise set up from the download application for the resource data residing in the host PC 401 via the LAN 400 into the image input/output system 100, as shown in FIG. 1.

At step S1003, a determination is made whether or not the received resource attribute is to be set up. The resource attributes to be necessarily set up (i.e., required for the image forming process) are decided in advance based on the characteristics of the device by the resource data creator (a list of set attributes created by the resource data creator is stored at a predetermined location). FIG. 12 shows an example of the list of set attributes. It is checked whether or not any resource attribute set at step S1002 exists in the list of attributes as shown in FIG. 12. If it exists, the procedure proceeds to step S1004. If not, the procedure goes to step S1005.

At step S1004, a flag indicating the set-up of resource attribute is made true in the table for the list of resource attributes as shown in FIG. 12, and the procedure proceeds to step S1005.

At step S1005, a confirmation is made whether or not that flag indicating that all the resource attributes received are set in the list of resource attributes is made true. After the processing for all the resource attributes received is ended, the procedure proceeds to step S1006.

At step S1006, an instruction for validating the resource data downloaded by the download application from the host PC 401 via the LAN 400 into the image input/output system 100 is received, as shown in FIG. 1. The image input/output system 100 can recognize the downloaded resource data owing to this validation.

At step S1007, a determination is made whether or not the downloaded resource data is incorrect. This determination is made by checking whether or not there is any attribute having the flag of false in the list of resource attributes to be set as shown in FIG. 12. If any one of the attributes is not set, it is judged that the resource data is incorrect or incomplete, and the procedure proceeds to step S1008. If all the attributes are set, it is judged that the resource data is correct, whereby the resource data is usable from the following job.

Step S1008 takes place when it is judged that the downloaded resource data is incorrect. In this case, since there is a high possibility that the desired output result is not obtained employing the resource data, the resource data is deleted by the image input/output system 100, and the procedure proceeds to step S1009.

At step S1009, a decision as to which of the resource data is employed for the print job is made by retrieving the resource data stored in the image input/output system at the time of shipment from the factory, because the resource data is stored in advance as the default value in the image input/output system 100 at the time of shipment from the factory.

More specifically, the "default flag at the time of shipment from the factory" attribute is retrieved from the table of attributes to be set (shown in FIG. 12) that are held for each resource object to search the resource data having the value of true. The corresponding resource object is available for the print job.

Thereby, even when the downloaded resource data is incorrect, the resource data at the time of shipment from the factory is employed for the print job, whereby the resource data is output without using incorrect resource data.

Third Embodiment

Figure 11:
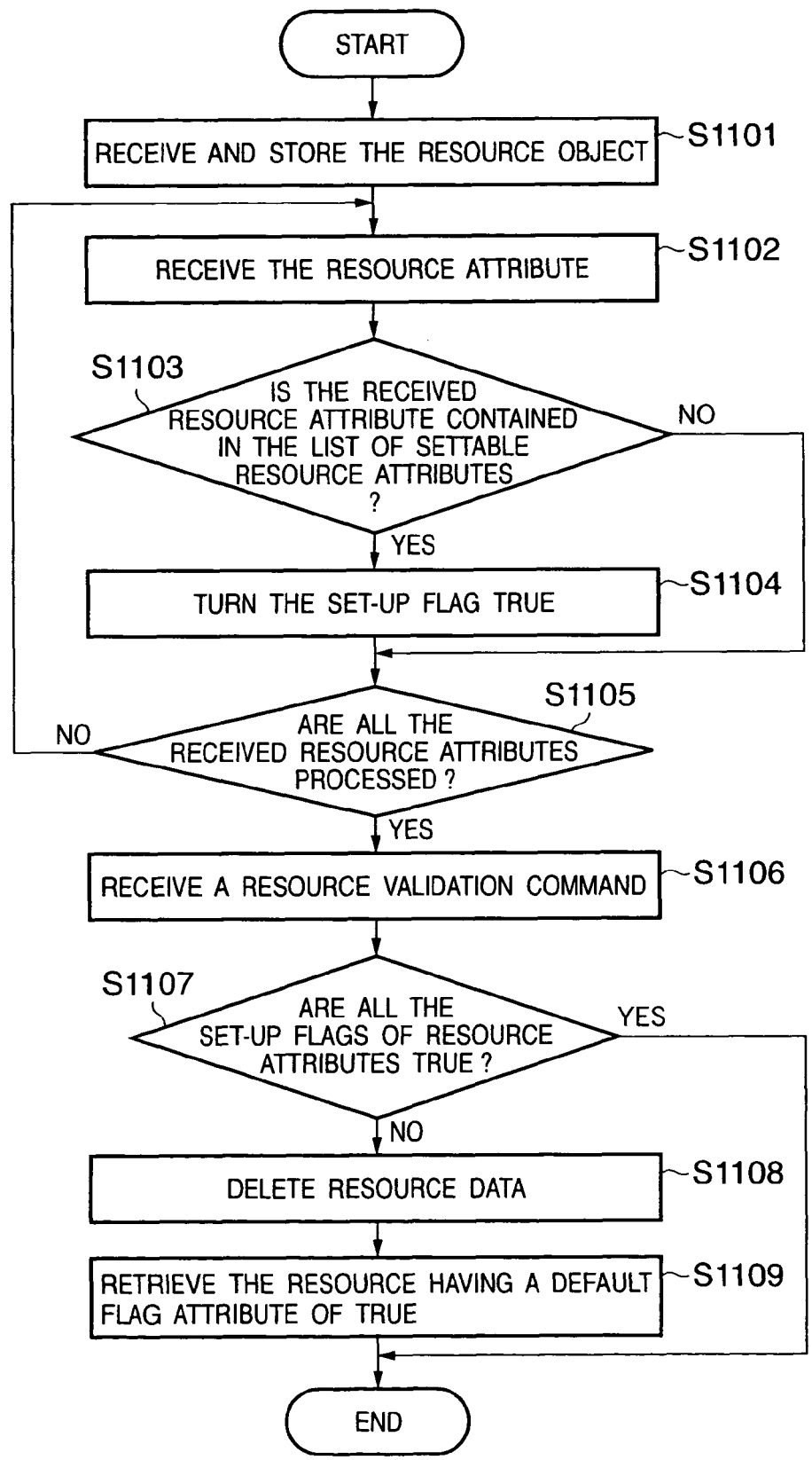
FIG. 11 is a flowchart showing a process for deleting the improper resource data when downloaded, and deciding default resource data to be set by referring to a default flag attribute, the process being performed in an image forming device for implementing the image forming method according to a third embodiment of the present invention.

In the second embodiment, the downloaded resource data is deleted, if it is incorrect, and the resource data at the time of shipment from the factory is employed for the print job. However, the resource data indicated by the "default flag" attribute may be employed instead. Referring to FIG. 11, the third embodiment will be described below.

In the third embodiment, the steps up to S1108 are the same as in the second embodiment. At step S1109, unlike the second embodiment, the applied resource data is decided by referring to the "resource default flag" attribute but not the "default flag at the time of shipment from the factory" attribute. The "default flag at the time of shipment from the factory" attribute has the read-only attribute, and is not set up by the downloading person. On the other hand, the "resource default flag" attribute is settable by the downloading person.

Whether the attribute is read-only or settable by the downloading person is controlled by software.

Other Embodiment

This invention may be applied to the system consisting of a plurality of apparatuses (e.g., host computer, interface equipment, reader, printer) or the system consisting of one apparatus (e.g., copying machine, facsimile apparatus).

The object of the invention may be achieved in such a way that a storage medium storing a program code of software for implementing the functions of the above embodiments is supplied to the system or the apparatus, and the program code stored in the storage medium is read and executed by a computer (or CPU or MPU) of the system or the apparatus.

In this case, the program code itself read from the storage medium implements the functions of the above embodiments, and the storage medium storing the program code makes up a part of this invention.

Examples of the storage medium for supplying the program code include a floppy (registered trademark) disk, a hard disk, an optical disk, an optical magnetic disk, CD-ROM, CD-R, a magnetic tape, a non-volatile memory card, and ROM.

Also, the functions of the above embodiments may be implemented when the computer reads and executes the program code, or when the OS (Operating System) working on the computer performs a part or all of the actual process in accordance with an instruction of the program code.

Moreover, the functions of the above embodiments may be implemented when the program code read from the storage medium is written in a function extension board inserted into the computer or a memory equipped in a function extension unit connected to the computer, and the CPU provided for the function extension board or the function extension unit performs a part or all of the actual process in accordance with an instruction of the program code.

As described above, with this invention, the desired output result is obtained by avoiding a situation that the downloaded resource data in incomplete state is employed for output when the resource data is downloaded into the image forming apparatus.

Also, the storage area of the device is effectively employed by preventing the downloaded resource data in the incomplete state from wasting the storage area of the device.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus for forming an image of a predetermined color space based on a downloaded profile downloaded via a network, comprising:
receiving means for receiving said downloaded profile and attribute information of the downloaded profile;
storage means for storing attribute items to be used to determine whether or not the downloaded profile is an incorrect profile, the stored attribute items comprising file creation date and time, a profile use purpose and a profile color space;
determination means for determining, when said receiving means receives the attribute information of the downloaded profile, whether or not the downloaded profile received by said receiving means is an incorrect profile by comparing the attribute information of the downloaded profile received by said receiving means with at least the profile creation date and time, profile use purpose and profile color space of the attribute items stored in said storage means and by determining that the downloaded profile is an incorrect profile when the attribute information of the downloaded profile received by said receiving means does not include attribute data corresponding to the profile creation date and time, the profile use purpose and the profile color space in the attribute items stored in said storage means; and deletion means for deleting the downloaded profile received by said receiving means when it is determined that the downloaded profile received by said receiving means is an incorrect profile by said determination means.

2. A data processing method for processing by an image forming apparatus for forming an image of a predetermined color space based on a downloaded profile downloaded via a network, comprising:

a step of receiving in the image forming apparatus, the downloaded profile and attribute information of the downloaded profile;

a step of storing in the image forming apparatus, attribute items to be used to determine whether or not the downloaded profile is an incorrect profile, the stored attribute items comprising at least a profile creation date and time, a profile use purpose and a profile color space;

a step of determining by the image forming apparatus, when the attribute information of downloaded profile is received in said receiving step, whether or not the downloaded profile-received in said receiving step is an incorrect profile by comparing the attribute information of the downloaded profile received in said receiving step with at least the profile creation date and time, profile use purpose and profile color space of the attribute items stored in said storing step and determining that the download profile is an incorrect profile when the attribute information of the downloaded profile received in said receiving step does not include attribute data corresponding to the profile creation date and time, the profile use purpose and the profile color space included in the attribute items stored in said storing step; and a step of deleting by the image forming apparatus, the downloaded profile received at said receiving step, when it is determined that the downloaded profile received in said receiving step is an incorrect profile in said determining step.

3. A non-transitory computer-readable storage medium encoded with a computer-executable program for implementing an image forming method by an image forming apparatus for forming an image of a predetermined color space based on a downloaded profile downloaded via a network, said computer-executable program comprising:

a program code for a receiving step of receiving by the image forming apparatus the downloaded profile which is required for an image forming process in the image forming apparatus and attribute information of the downloaded profile;

a program code for a storing step of storing by the image forming apparatus attribute items to be used to determine whether or not the downloaded profile is an incorrect profile, the stored attribute items comprising at least a profile creation date and time, a profile use purpose and a profile color space;

a program code for a determination a step of determining by the image forming apparatus, when the attribute information of downloaded profile is received in said receiving step, whether or not the downloaded profile-received in said receiving step is an incorrect profile by comparing the attribute information of the downloaded profile received in said receiving step with at least the profile creation date and time, profile use purpose and profile color space of the attribute items stored in said storing step and determining that the download profile is an incorrect profile when the attribute information of the downloaded profile received in said receiving step does not include attribute data corresponding to the profile creation date and time, the profile use purpose and the profile color space included in the attribute items stored in said storing step; and a program code for a deletion step of deleting by the image forming apparatus the downloaded profile received at said receiving step, when it is determined that the downloaded profile received in said receiving step is incorrect in said determining step.

* * * * *